United States Patent [19]

Vamvakaris et al.

[11] 4,404,389
[45] Sep. 13, 1983

[54] THIAZOLE CONTAINING COUMARIN COMPOUNDS

[75] Inventors: Christos Vamvakaris, Kallstadt; Manfred Patsch, Wachenheim; Wolfgang Mach, Hockenheim, all of Fed. Rep. of Germany

[73] Assignee: BASF Aktiengesellschaft, Rheinland-Pfalz, Fed. Rep. of Germany

[21] Appl. No.: 403,118

[22] Filed: Jul. 29, 1982

Related U.S. Application Data

[63] Continuation of Ser. No. 11,995, Feb. 14, 1979.

[30] Foreign Application Priority Data

Feb. 23, 1978 [DE] Fed. Rep. of Germany ....... 2807761

[51] Int. Cl.³ ........................................... C07D 417/04
[52] U.S. Cl. ................................... 548/201; 544/133; 544/367; 546/196; 548/183; 548/186; 548/187; 548/188; 548/200; 548/203; 548/204; 548/205
[58] Field of Search ............... 548/183, 186, 187, 188, 548/200, 201, 203, 204, 205; 544/133, 367; 546/196

[56] References Cited

U.S. PATENT DOCUMENTS

3,539,583 11/1970 Voltz et al. ........................ 544/151
4,055,568 10/1977 Patsch et al. ........................ 548/134

FOREIGN PATENT DOCUMENTS

2126811 12/1972 Fed. Rep. of Germany .

*Primary Examiner*—Robert W. Ramsuer
*Attorney, Agent, or Firm*—Oblon, Fisher, Spivak, McClelland & Maier

[57] ABSTRACT

Compounds of the general formula I

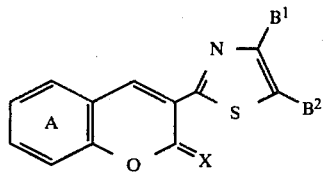

where
$B^2$ and $B^2$ independently of one another are hydrogen, $C_1$-$C_6$-alkyl which may or may not be interrupted by oxygen or sulfur and is unsubstituted by hydroxyl, $C_1$-$C_4$-alkoxy, $C_1$-$C_4$-alkylmercapto, cyano, phenylmercapto (which is unsubstituted by chorine or methyl), unsubstituted or substituted carbamoyl or a carboxylic acid ester group, benzyl or phenylethyl which are unsubstituted or substituted in the ring by chlorine, bromine, methyl, ethyl, methoxy or ethoxy, phenyl which is unsubstituted or substituted by chlorine, bromine, hydroxyl, methoxy, ethoxy, methyl, $C_1$-$C_4$-alkylmercapto, $C_1$-$C_4$-alkanoylamino or amino, unsubstituted or substituted carbamoyl or a carboxylic acid ester group,
$B^2$ may in addition be cyano, $C_2$-$C_4$-alkanoyl, benzoyl which is unsubstituted or substituted by chlorine, methyl, methoxy or ethoxy, $C_1$-$C_6$-alkylsulfonyl, or phenylsulfonyl, which is unsubstituted or substituted by chlorine, bromine, methyl, methoxy, ethoxy, amino, $C_1$-$C_4$-alkanoylamino, $C_1$-$C_4$-alkylsulfonyl or benzoylamino,
$B^1$ and $B^2$ together may also be a saturated 5-membered or 6-membered ring which may or may not contain oxygen or sulfur,
X is oxygen or imino and
the ring A may be substituted.

Such compounds are outstandingly suitable for dyeing synthetic fibers and plastics.

2 Claims, No Drawings

THIAZOLE CONTAINING COUMARIN COMPOUNDS

This is a continuation of application Ser. No. 011,995, filed Feb. 14, 1979.

The present invention provides novel compounds of the general formula I

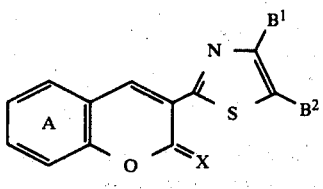

where $B^1$ and $B^2$ independently of one another are hydrogen, $C_1$-$C_6$-alkyl which may or may not be interrupted by oxygen or sulfur and is unsubstituted or substituted by hydroxyl, $C_1$-$C_4$-alkoxy, $C_1$-$C_4$-alkylmercapto, cyano, phenylmercapto (which is unsubstituted or substituted by chlorine or methyl), unsubstituted or substituted carbamoyl or a carboxylic acid ester group, benzyl or phenylethyl which are unsubstituted or substituted in the ring by chlorine, bromine, methyl, ethyl, methoxy or ethoxy, phenyl which is unsubstituted or substituted by chlorine, bromine, hydroxyl, methoxy, ethoxy, methyl, $C_1$-$C_4$-alkylmercapto, $C_1$-$C_4$-alkanoylamino or amino, unsubstituted or substituted carbamoyl or a carboxylic acid ester group, $B^2$ may in addition be cyano, $C_2$-$C_4$-alkanoyl, benzoyl which is unsubstituted or substituted by chlorine, methyl, methoxy or ethoxy, $C_1$-$C_6$-alkylsulfonyl, or phenylsulfonyl which is unsubstituted or substituted by chlorine, bromine, methyl, methoxy, ethoxy, amino, $C_1$-$C_4$-alkanoylamino, $C_1$-$C_4$-alkylsulfonyl or benzoylamino, $B^1$ and $B^2$ together with the carbon atoms to which they are attached may also form a 5-membered or 6-membered ring fused to the thiazole ring and optionally containing oxygen or sulfur but free from further unsaturation, X is oxygen or imino and the ring A may be substituted.

In a preferred embodiment, the invention provides novel compounds of the general formula I a

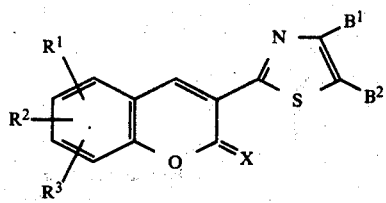

where $R^1$ is hydrogen, $C_1$-$C_4$-alkyl, benzyl, phenylethyl, phenyl, hydroxyl, $C_1$-$C_4$-alkoxy, acyloxy, fluorine, chlorine, bromine, amino or substituted amino, $R^2$ is hydrogen, $C_1$-$C_4$-alkyl, hydroxy, $C_1$-$C_4$-alkoxy, acyloxy, chlorine or bromine, $R^1$ and $R^2$ together with the carbon atoms to which they are attached may also form a fused benzo ring, $R^3$ is hydrogen, $C_1$-$C_4$-alkyl or chlorine, and $B^1$, $B^2$ and X have the meanings stated above.

Specific examples of radicals $B^1$ and $B^2$, in addition to those already mentioned, are: $CH_3$, $C_2H_5$, $C_3H_7$, $C_4H_9$, $C_5H_{11}$, $C_6H_{13}$, $CH_2OH$, $CH_2OCH_3$, $CH_2OC_2H_5$, $C_2H_4OH$, $C_2H_4OCH_3$, $C_2H_4OC_2H_5$, $C_2H_4OC_4H_9$, $C_2H_4OC_2H_4OH$, $C_2H_4OC_2H_4OCH_3$, $C_2H_4OC_2H_4OC_4H_9$,

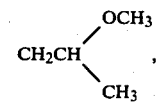

$C_2H_4SCH_3$, $C_2H_4SC_2H_5$, $CH_2SC_6H_5$, $C_2H_4SC_6H_5$, $C_2H_4SC_6H_4Cl$, $C_2H_4CN$, $CH_2CN$, $CH_2CONH_2$, $CH_2CONHCH_3$, $CH_2CON(CH_3)_2$, $C_2H_4CONH_2$, $CH_2COOCH_3$, $CH_2COOC_2H_5$, $CH_2COOC_4H_9$, $C_2H_4COOCH_3$, $C_2H_4COOC_4H_9$, $CONH_2$, $CONHCH_3$, $CONHC_2H_5$, $CONHC_4H_9$,

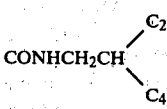

$CON(CH_3)_2$, $CON(C_2H_5)_2$, $CONHC_2H_4OCH_3$, $CONHC_2H_4OC_2H_5$, $CONH(CH_2)_3OC_2H_4OC_6H_5$, $CONHC(CH_2)_3OCH_2C_6H_5$, $CON(C_2H_4OCH_3)_2$, $CON(C_2H_4OC_2H_5)_2$, $COOCH_3$, $COOC_2H_5$, $COOC_3H_7$, $COOC_4H_9$, $COOC_5H_{11}$, $COOC_6H_{13}$, $COOC_8H_{17}$, $COOCH_2$—$CH$=$CH_2$, $COOC_2H_4OCH_3$, $COOC_2H_4OC_2H_5$, $COOC_2H_4OC_4H_9$, $COOC_2H_4OC_2H_4OCH_3$, $COOC_2H_4OC_2H_4OC_4H_9$, $COOCH_2CH_2CH_2OCH_3$, $COOCH_2CH_2CH_2OC_3H_7$, $CO(CH_2)_3OC_2H_4OC_6H_5$, $COO(CH_2)_3OCH_2C_6H_5$, $COOC_2H_4SC_2H_5$ and $COOC_2H_4SC_6H_5$.

The radicals with more than two carbon atoms, such as $C_3H_7$ or $C_4H_9$, include the n- and i-structures and, where relevant, the t-structures.

Examples of alkyl and alkoxy radicals $B^1$, $B^2$ and $R^1$ to $R^3$ are butyl, propyl, ethyl, butoxy, propoxy and especially methyl, methoxy and ethoxy.

Acyloxy radicals $R^1$ and $R^2$ are, in particular, $C_1$-$C_8$-alkanoyloxy, eg. acetoxy, propionyloxy, butyryloxy, hexanoyloxy, octanoyloxy and β-ethylhexanoyloxy, or benzoyloxy.

The substituted amino radicals $R^1$ generally have the formula

where $Z^1$ and $Z^2$ independently of one another are hydrogen or unsubstituted or substituted alkyl, cycloalkyl, aralkyl or aryl or $Z^1$ and $Z^2$ together with the nitrogen form a heterocyclic ring.

Preferred substituted amino radicals have the formula

where $Z^3$ is hydrogen, $C_1$-$C_4$-alkyl which is unsubstituted or substituted by hydroxyl, cyano, $C_1$-$C_4$-alkoxy, chlorine, bromine, carboxyl, carbo-$C_1$-$C_4$-alkoxy, carboxamide or acetoxy, cyclohexyl, benzyl, phenylethyl, phenyl or p-tolyl, $Z^4$ is hydrogen or $C_1$-$C_4$-alkyl which is unsubstituted or substituted by cyano, $C_1$-$C_4$-alkoxy, chlorine, bromine, carboxyl, carbo-$C_1$-$C_4$-alkoxy, carboxamide or acetoxy and $Z^3$ and $Z^4$ together with the nitrogen may also form a 5-membered or 6-membered saturated, heterocyclic ring.

In addition to the radicals already mentioned specifically, the following may be mentioned at substituents:

$Z^3$ and $Z^4$: methyl, ethyl, n- and i-propyl, n- and i-butyl, β-methoxyethyl, β-ethoxyethyl, β-acetoxyethyl, β-chloroethyl, β-carbomethoxyethyl, β-carboethoxyethyl, β-carbobutoxyethyl, β-methoxypropyl, β-ethoxypropyl, β-methoxy-γ-chloropropyl and β-acetoxypropyl.

Together with the nitrogen, $Z^3$ and $Z^4$ are, for example, a pyrrolidine, piperidine, morpholine, piperazine or N-methylpiperazine radical.

A compound of the general formula I may be prepared by reacting a compound of the general formula II

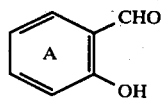

with a compound of the general formula III

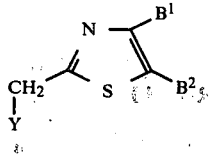

where Y is cyano, $C_1$-$C_4$-alkoxycarbonyl or carbamoyl, of which cyano and carbamyl are preferred, and $B^1$, $B^2$ and A have the meanings given above.

It is also possible to react a compound of the general formula IV

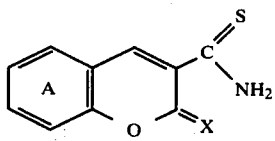

with a compound of the general formula

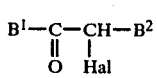

where Hal is chlorine or bromine and $B^1$, $B^2$ and A have the meanings given above.

The preparation of compounds of the general formula IV is known, for example, from East German Pat. No. 109,017.

A compound of the formula IV is also obtained if a compound of the formula V

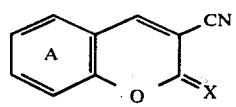

where A and X have the above meanings, is reacted with $H_2S$ in an organic solvent in the presence of a basic catalyst, eg. triethylamine, at from 50° to 120° C. Examples of organic solvents which may be used are alcohols, glycols, glycol ethers, hydrocarbons, pyridine or amides.

The compounds of the general formula III may be prepared by methods similar to that described by Hantzsch (Ann. 250, 257).

The reactions to give the compounds of the general formula I may be carried out similarly to conventional methods; advantageously, the reaction is carried out in an organic solvent, such as an alcohol, glycol, glycol ether, hydrocarbon, halohydrocarbon, amide, ether or ketone, or in dimethylsulfoxide, with or without the presence of water.

Examples of preferred solvents are methanol, ethanol, n- and i-propanol, n- and i-butanol, glycol monomethyl ether, glycol monoethyl ether and toluene.

The reaction is preferably carried out in the presence of an acid or basic catalyst. Examples of suitable catalysts are acetic acid, tertiary amines, eg. triethylamine or piperidine or pyrrolidine.

Details of how the reaction may be carried out are to be found in the Examples, where parts and percentages are by weight, unless stated otherwise.

Compounds of particular importance are those of the formula I b

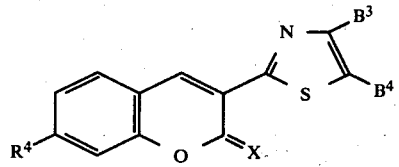

where $B^3$ and $B^4$ independently of one another are hydrogen, $C_1$-$C_4$-alkyl, phenyl which is unsubstituted or substituted by chlorine, methyl or methoxy, N-mono-substituted or N,N-di-substituted carbamyl of 1 to 11 carbon atoms in the substituents, or a carboxylic acid ester group of 1 to 11 carbon atoms in the alcohol radical, $B^4$ may also be cyano, acetyl, propionyl, benzoyl, methylsulfonyl, ethylsulfonyl, phenylsulfonyl, chlorophenylsulfonyl or tolylsulfonyl, $R^4$ is hydroxyl, $C_1$-$C_4$-alkoxy, $C_1$-$C_8$-alkanoyloxy, benzoyloxy or

and X, $Z^3$ and $Z^4$ have the meanings given above.

$Z^3$ and $Z^4$ are preferably independently of one another methyl, ethyl or propyl or, together with the nitrogen, form a saturated heterocyclic ring, eg. pyrrolidine, morpholine or piperazine.

$R^4$ is preferably

The compounds of the formula I fluoresce and are in the majority of cases suitable for use as dyes, especially for dyeing polyesters. They give brilliant dyeings, having, in some cases, very good fastness characteristics, amongst which the fastness to thermofixing, and the wetfastness, deserve particular mention.

Some of the new dyes can also be applied by the process described in German Pat. No. 1,811,796.

Further, some of the dyes may be used for transfer printing and as solvent dyes.

Some of the new products are suitable for use as optical brighteners.

The compounds of the formula I can also be considered for use as laser dyes.

Production of precursors

EXAMPLE A 17.7 parts of thiocarbamoyl-acetamide, in 60 parts by volume of isopropanol, are stirred with 29.9 parts of $\omega$-bromo-acetophenone for 2 hours at 50° C. After this time, the reaction mixture is stirred into ice water and rendered neutral with 2 N NaOH, and the product is filtered off. 28 parts (85.6% of theory) of [4-phenyl-thiazolyl-2-]-acetamide, of melting point 190°–192° C., are obtained.

The thiazoles of the formula III shown in Table 1 are obtained if the corresponding starting materials are employed and in other respects the procedure described in Example A is followed.

TABLE 1

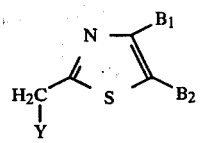

(III)

| Example | Y | $B_1$ | $B_2$ | Melting point |
|---|---|---|---|---|
| B | $-C(=O)NH_2$ | $CH_3$ | $-C(=O)NH-C_6H_5$ | 148–150 |
| C | $-C(=O)NH_2$ | $CH_3$ | $C_6H_5$ | 136–139 |
| D | $-C(=O)OC_2H_5$ | $CH_3$ | $C_6H_5$ | liquid |
| E | $-C(=O)NH_2$ | $CH_3$ | $-C(=O)NH-C_6H_4-Cl$ | 188–190 |
| F | " | " | $-C(=O)O-CH_3$ | 160–162 |
| G | " | " | $-C(=O)OC_2H_5$ | 95–97 |

TABLE 1-continued $$\text{(III)}$$

Structure (III): thiazole ring with $H_2C(Y)-$ at position 2, $B_1$ at position 4, $B_2$ at position 5.

| Example | Y | $B_1$ | $B_2$ | Melting point |
|---|---|---|---|---|
| H | " | " | $-C(=O)-OCH(CH_3)_2$ | 98–100 |
| I | " | " | $-C(=O)-O-i\text{-Bu}$ | 76–79 |
| K | $-C(=O)NH_2$ | " | $-C(=O)-O(C_2H_4-O)_2-C_2H_5$ | 55–59 |
| L | " | " | $-C(=O)-O-C_2H_4-O-C_4H_9$ | 48–50 |
| M | CN | " | $C_6H_5$ | |
| N | $-C(=O)NH_2$ | $-CH_3$ | $-C_6H_5$ | 136–139 |
| O | " | $-C_6H_5$ | $-H$ | 190–192 |
| P | " | $-CH_2C(=O)OC_2H_5$ | $-H$ | 30° |
| Q | " | $CH_2Cl$ | $-H$ | 78–80 |
| R | " | $C_6H_5$ | $-CH_3$ | 70–75 |
| S | " | $CH_3$ | $-C(=O)-CH_3$ | 108–109 |
| T | " | $CH_3$ | $-C(=O)-C_6H_5$ | 192–195 |

Production of compounds according to the invention

EXAMPLE 1

8.3 parts of 7-diethylamino-3-thiocarbamoylcoumarin and 7 parts of ω-bromo-acetophenone in 30 parts by volume of isopropyl alcohol are boiled with 3 parts of triethylamine for 1 hour. The precipitate is filtered off and washed with isopropyl alcohol and water. 9.1 parts (80.6% of theory) of 7-diethylamino-3-(4-phenylthiazol-2-yl)-coumarin of melting point 127°–130° C. are obtained.

7-Diethylamino-3-thiocarbamoylcoumarin, used as the starting compound, may be prepared as described in East German Pat. No. 109,017.

The thiazolylcoumarins listed in Table 2 were synthesized similarly.

TABLE 2

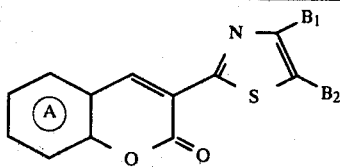

| Example | (A) ring | $B_1$ | $B_2$ | Melting point |
|---|---|---|---|---|
| 2 | 4-(N,N-diethylamino)-2-methylphenyl (C₂H₅)₂N-, CH₃ substituted phenyl | $CH_3$ | $-\underset{\underset{O}{\|}}{C}-NH-C_2H_5$ | 178–180 |
| 3 | " | " | $-\underset{\underset{O}{\|}}{C}-NH-$(2-Cl-phenyl) | 223–225 |
| 4 | " | " | $-\underset{\underset{O}{\|}}{C}-NH-C_6H_5$ | 238–240 |
| 5 | " | " | $-\underset{\underset{O}{\|}}{C}-O-CH(CH_3)_2$ | 179–182 |
| 6 | " | " | $C_6H_5$ | 181–190 |
| 7 | 4-methoxy-2-methylphenyl (CH₃O-, CH₃ substituted phenyl) | " | " | 230–235 |
| 8 | 3,5-dichloro-2-methylphenyl | " | " | 189–191 |
| 9 | " | $C_6H_5$ | $CH_3$ | 220–222 |
| 10 | 1,2-naphthyl | $CH_3$ | $C_6H_5$ | 194–196 |
| 11 | 4-(N,N-dimethylamino)-2-methylphenyl | $B_1 + B_2 =$ cyclohexyl (fused ring) | | 217–225 |
| 12 | 4-morpholino-2-methylphenyl | $CH_3$ | $C_6H_5$ | 260–266 |

TABLE 2-continued

[Structure: coumarin with thiazole substituent, showing ring A, B₁, B₂ positions]

| Example | A | B₁ | B₂ | Melting point |
|---|---|---|---|---|
| 13 | [piperidinyl-dimethylphenyl group] | " | " | 168–174 |

EXAMPLE 14

3.9 parts of 4-diethylaminosalicylaldehyde and 4.3 parts of the compound from Example F in 40 parts by volume of n-butanol are refluxed with 0.5 part by volume of pyrrolidine for 1 hour. The precipitate formed is filtered off and washed with n-butanol and water. 6.5 parts (87.4% of theory) of 7-diethylamino-3-(4-methyl-5-carbomethoxy-thiazol-2-yl)-coumarin, of melting point 252°–253° C., are obtained.

The coumarins listed in Table 3 were synthesized similarly.

TABLE 3

[Structure: coumarin with thiazole substituent, showing ring A, B₁, B₂ positions]

| Example | A | B₁ | B₂ | Melting point |
|---|---|---|---|---|
| 15 | [N,N-diethylamino-dimethylphenyl] | $CH_3$ | $CONHC_6H_5$ | 235–37 |
| 16 | " | " | $CONH$—[4-Cl-phenyl] | 245–248 |
| 17 | [CH₃O-dimethylphenyl] | " | $C_6H_5$ | 235–239 |
| 18 | [naphthyl] | " | " | 195–97 |
| 19 | [3,5-dichloro-dimethylphenyl] | $CH_3$ | " | 189–191 |

TABLE 3-continued

[Structure: chromen-2-one with =CH- linking to thiazole ring bearing B₁ and B₂ substituents, fused to ring A]

| Example | A (ring) | B₁ | B₂ | Melting point |
|---|---|---|---|---|
| 20 | 4-(N,N-diethylamino)phenyl | C₆H₅ | H | 130–133 |
| 21 | 4-chlorophenyl | " | H | 189–191 |
| 22 | 4-(N,N-diethylamino)phenyl | CH₃ | CO₂CH₃ | 252–253 |
| 23 | " | " | CO₂C₂H₅ | 216–217 |
| 24 | " | " | CO₂CH(CH₃)₂ | 185–188 |
| 25 | " | " | CO₂CH₂CH(CH₃)₂ | 207–210 |
| 26 | " | " | CO₂C₂H₄—OC₄H₉ | 165–167 |
| 27 | " | " | CO₂C₂H₄—OC₄H₉ | 118–120 |
| 28 | 4-chlorophenyl | " | CO₂C₂H₄—OC₄H₉ | 133–134 |
| 29 | 3,5-dichlorophenyl | " | " | 132–133 |
| 30 | 4-hydroxyphenyl | " | CO₂C₂H₅ | 262–263 |
| 31 | naphthyl | " | C₆H₅ | 195–197 |

TABLE 3-continued

![structure showing ring A fused coumarin with thiazole B1/B2]

| Example | A | B₁ | B₂ | Melting point |
|---|---|---|---|---|
| 32 | 4-Cl-phenyl (with methyl) | " | " | 228–232 |
| 33 | " | C₆H₅ | CH₃ | 223–225 |
| 34 | 4-Cl-phenyl (with methyl) | " | " | 241–242 |
| 35 | 4-(N,N-diethylamino)-phenyl (with methyl) | " | " | 185–189 |
| 36 | " | CH₃ | COCH₃ | 226–228 |
| 37 | 4-Cl-phenyl (with methyl) | " | " | 233–235 |
| 38 | 4-(N,N-diethylamino)-phenyl (with methyl) | CH₃ | COC₆H₅ | 159–164 |
| 39 | 4-morpholino-phenyl (with methyl) | " | " | 240–243 |
| 40 | " | " | CO₂—C₄H₉ | 253–256 |

EXAMPLE 41

3.9 parts of 4-diethylaminosalicylaldehyde and 4 parts of 2-cyanomethyl-4-phenyl-thiazole in 40 parts by volume of isopropyl alcohol are refluxed with 0.5 part by volume of pyrrolidine for 1 hour. The reaction mixture is then cooled and the precipitate is filtered off and washed. 6.1 parts (81.3% of theory) of 7-diethylamino-3-(4-phenylthiazol-2-yl)-iminocoumarin, of melting point 120°–128° C., are obtained.

We claim:

1. A compound of the formula:

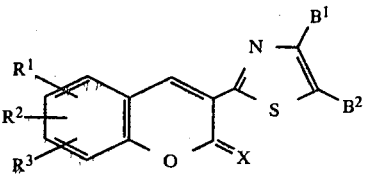

Ia wherein $B^1$ and $B^2$ independently of one another are hydrogen; $C_1$–$C_6$ alkyl; $C_1$–$C_6$ alkoxy optionally interrupted by oxygen or sulfur; hydroxy; alkylmercapto; $C_6H_5SCH_2$— or $C_6H_5SC_2H_4$— optionally substituted in the phenyl ring by chloro, bromo, hydroxy or alkoxy; $COOCH_3$, $COOC_2H_5$, $COOC_3H_7$, $COOC_4H_9$, $COOC_5H_{11}$, $COOC_6H_{13}$, COOC$_8$H$_{17}$, COOCH$_2$—CH=CH$_2$, COOC$_2$H$_4$OCH$_3$, COOC$_2$H$_4$OC$_2$H$_5$, COOC$_2$H$_4$OC$_4$H$_9$, COOC$_2$H$_4$OC$_2$H$_4$OCH$_3$, COOC$_2$H$_4$OC$_2$H$_4$OC$_4$H$_9$, COOCH$_2$CH$_2$CH$_2$OCH$_3$, COOCH$_2$CH$_2$CH$_2$OC$_3$H$_7$, COO(CH$_2$)$_3$OC$_2$H$_4$OC$_6$H$_5$, COO(CH$_2$)$_3$OCH$_2$C$_6$H$_5$, COOC$_2$H$_4$SC$_2$H$_5$ OR COOC$_2$H$_4$SC$_6$H$_5$; carbamoyl or substituted carbamoyl;

B$^2$ in addition is cyano, C$_2$-C$_4$ alkanoyl, benzoyl, C$_1$-C$_4$ alkylsulfonyl or phenylsulfonyl;

R$^1$ is hydrogen, C$_1$-C$_4$ alkyl, hydroxy, C$_1$-C$_4$ alkoxy, C-acyloxy, chloro, bromo, amino or substituted amino;

R$^2$ is hydrogen; C$_1$-C$_4$ alkyl, hydroxy, C$_1$-C$_4$ alkoxy or C-acyloxy;

R$^3$ is hydrogen, chloro or bromo;

R$^1$ and R$^2$ together are —CH=CH—CH=CH— and X is NH or O.

2. The coumarin derivative of claim 1, which has the formula:

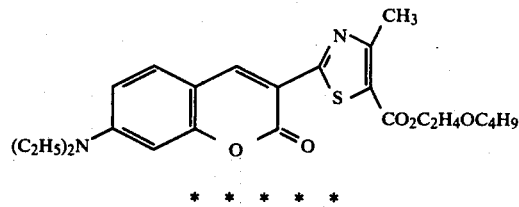

* * * * *